(12) United States Patent
Viegas Wentz et al.

(10) Patent No.: US 12,435,744 B2
(45) Date of Patent: Oct. 7, 2025

(54) SYSTEM OF ANCHORING BY SELF-LOCKING OF WOVEN FIBER SLEEVES

(71) Applicants: Petróleo Brasileiro S.A.-Petrobras, Rio de Janeiro (BR); SERVIÇO NACIONAL DE APRENDIZAGEM INDUSTRIAL DEPARTAMENTO REGIONAL DE SANTA CATARINA-SENAI/SC, Florianópolis (BR)

(72) Inventors: André Viegas Wentz, Porto Alegre (BR); Lucas Bianco Garcia Da Silva, Porto Alegre (BR); Hugo Francisco Lisboa Santos, Rio de Janeiro (BR); Frederico Eggers, Porto Alegre (BR); Enzo Costamilan, Porto Alegre (BR)

(73) Assignees: Petróleo Brasileiro S.A.—Petrobras; SERVIO NACIONAL DE APRENDIZAGEM, Rio de Janeiro (BR); INDUSTRIAL DEPARTAMENTO REGIONAL DE SANTA CATARINA—SENAI/SC, Florianópolis (BR)

(*) Notice: Subject to any disclaimer, the term of this patent is extended or adjusted under 35 U.S.C. 154(b) by 528 days.

(21) Appl. No.: 17/899,922

(22) Filed: Aug. 31, 2022

(65) Prior Publication Data

US 2023/0071276 A1    Mar. 9, 2023

(30) Foreign Application Priority Data

Sep. 1, 2021   (BR) ...................... 10 2021 017363 7

(51) Int. Cl.
*F16B 7/04*   (2006.01)
*F16L 55/28*  (2006.01)

(52) U.S. Cl.
CPC ............ *F16B 7/0413* (2013.01); *F16L 55/28* (2013.01)

(58) Field of Classification Search
CPC . E21B 19/16; F16L 31/00; F16L 21/00; F16L 33/00; F16L 33/01
See application file for complete search history.

(56) References Cited

U.S. PATENT DOCUMENTS

| | | | | |
|---|---|---|---|---|
| 1,994,587 A | * | 3/1935 | Nakane ................... | F16L 33/01 |
| | | | | 138/131 |
| 2,394,632 A | * | 2/1946 | Parker ................... | F16L 33/224 |
| | | | | 285/919 |

(Continued)

FOREIGN PATENT DOCUMENTS

| | | |
|---|---|---|
| BR | 102018015804 A2 | 2/2020 |
| GB | 2439147 A | 12/2007 |
| RU | 2629857 C1 | 9/2017 |

OTHER PUBLICATIONS

Dong et al. (Jan. 2017) "Slip and Stress of Tensile Armors in Unbonded Flexible Pipes Close to End Fitting Considering an Exponentially Decaying Curvature Distribution", Marine Structures, 51:110-133.

*Primary Examiner* — Daniel J Wiley
(74) *Attorney, Agent, or Firm* — Morrison & Foerster LLP

(57) ABSTRACT

Anchoring systems can be applied to connect a robotic system with its power supply structure (for example, umbilical cables), and then separate the same into several modules, each containing a pair of anchors. A sleeve is tensioned, by pulling the ring against its stop and, thus, performing a self-locking. The self-locking occurs because the friction force generated at the lace interface is greater than the sleeve tensioning force. In addition, the mesh is tightened by threading the stop of the ring in the house of the ring. The (Continued)

anchoring systems can be applied to any part of the robot and as many times as necessary, not being limited to the connection with the umbilical.

5 Claims, 7 Drawing Sheets

(56) References Cited

U.S. PATENT DOCUMENTS

| | | | | |
|---|---|---|---|---|
| 2,610,869 | A * | 9/1952 | Allison | F16L 33/01 285/91 |
| 3,044,163 | A * | 7/1962 | Bacher | F16L 33/01 285/95 |
| 3,055,682 | A * | 9/1962 | Bacher | F16L 33/18 285/248 |
| 3,062,564 | A * | 11/1962 | Stehle | F16L 33/224 285/41 |
| 3,393,267 | A * | 7/1968 | Busse | F16L 33/26 285/390 |
| 3,675,951 | A * | 7/1972 | Morin | F16L 33/01 285/39 |
| 3,820,825 | A * | 6/1974 | Morin | F16L 33/01 285/39 |
| 4,063,757 | A * | 12/1977 | Fuhrmann | F16L 33/01 285/251 |
| 4,123,088 | A * | 10/1978 | Tanaka | F16L 33/01 285/222.4 |
| 4,736,969 | A * | 4/1988 | Fouts | F16L 33/223 285/259 |
| 4,805,942 | A * | 2/1989 | Goodridge | F16L 33/01 285/179 |
| 4,875,717 | A * | 10/1989 | Policelli | F16L 47/20 138/109 |
| 4,950,001 | A * | 8/1990 | Briggs | F16L 33/01 285/222.1 |
| 6,173,995 | B1 * | 1/2001 | Mau | F16L 33/01 285/55 |
| 7,175,208 | B2 * | 2/2007 | Belcher | F16L 33/01 285/342 |
| 8,079,619 | B2 | 12/2011 | Witz et al. | |
| 9,574,690 | B2 * | 2/2017 | Clevelario | G01M 3/2853 |
| 9,601,914 | B2 * | 3/2017 | Chiu | H02G 15/007 |
| 10,527,210 | B2 * | 1/2020 | Paulo | F16L 33/01 |
| 11,204,114 | B2 * | 12/2021 | Leger | F16L 21/08 |
| 11,242,948 | B2 * | 2/2022 | Dhagat | F16L 13/10 |
| 2009/0284004 | A1 * | 11/2009 | Simmons | F16L 39/005 403/3 |
| 2010/0230952 | A1 * | 9/2010 | Ong | F16L 11/088 285/102 |
| 2014/0049039 | A1 * | 2/2014 | Karabelas | F16L 33/01 285/222.1 |
| 2014/0312612 | A1 * | 10/2014 | Dhagat | B23P 19/00 29/515 |
| 2015/0330890 | A1 * | 11/2015 | Clevelario | F16L 33/16 285/96 |
| 2016/0097471 | A1 * | 4/2016 | Moller Andersen | F16L 11/08 138/103 |
| 2017/0363236 | A1 * | 12/2017 | Rose | F16L 21/06 |
| 2018/0347738 | A1 * | 12/2018 | Zhang | F16L 33/01 |
| 2019/0226615 | A1 * | 7/2019 | Wu | F16L 33/01 |
| 2020/0080674 | A1 * | 3/2020 | Clements | F16L 33/01 |
| 2020/0158267 | A1 * | 5/2020 | Charlesworth | E21B 17/04 |
| 2021/0156498 | A1 * | 5/2021 | Dhagat | B21D 39/20 |
| 2021/0172548 | A1 * | 6/2021 | Dhagat | F16L 13/116 |
| 2021/0372556 | A1 | 12/2021 | Reis et al. | |
| 2022/0341808 | A1 * | 10/2022 | Benirschke | F16L 11/08 |

* cited by examiner

SYSTEM OF ANCHORING BY SELF-LOCKING OF WOVEN FIBER SLEEVES

CROSS-REFERENCE TO RELATED APPLICATION

This application claims priority to Brazilian Application No. 10 2021 017363 7 filed on Sep. 1, 2021, and entitled "SYSTEM OF ANCHORING BY SELF-LOCKING OF WOVEN FIBER SLEEVES," the disclosure of which is incorporated herein by reference in its entirety.

FIELD OF THE INVENTION

The present invention is based on the development of a solution for anchoring in small internal diameter pipes.

The invention is used to compose the structure of a robotic system that operates inside pipes, and can be used in several structures that work under tension, using fiber meshes in the form of a cylindrical sleeve.

DESCRIPTION OF THE STATE OF THE ART

For the correct functioning of a robotic system of intervention in pipes, structures for transmission of mechanical loads are necessary. Such structures, when subjected to large mechanical demands, require excessively large dimensions, which makes their application in robots that work in restricted environments, such as flexible pipes, difficult. For this problem, a developed solution was the use of woven sleeves of high strength fibers that transmit tensile loads, as described in patent number BR1020180158040, which need to be somehow attached to the rest of the robot's structures.

Currently, an anchor made of epoxy resin is used to lock the threads or wires of the tension mesh, which therefore cannot be assembled and disassembled after this application, as described in Dong L. et al., Marine Structures, 51 (2017), pp. 110-133 and in Fabiano, B., End Fitting for unbonded flexible pipes, Simeros, 2017.

In another approach, a web of threads known as the "Chinese finger" is used around the umbilical cables of robotic systems. These have a finite length and are bolted to eyebolts on the structure that performs the tension. By the "Chinese finger" compression effect, the web creates a normal force and thus friction to pull the cables.

By not using resin structures, it is possible to assemble and disassemble the robot with ease, not requiring a laboratory environment for this execution. Removing the resin is laborious and creates several residues and, in most cases, damages the wire structures. The system proposed in this invention is demountable and does not use resin to anchor the flexible web.

The solution with Chinese finger requires that at the tip where it is fastened on the robot it is possible to place large screws perpendicular to the longitudinal direction of the robot. Since in this region the web is reduced to some points, all the tension load ends up not being distributed, being accumulated in these fasteners. The system proposed in the present invention uses a lace under a ring that is in the largest possible circumference of the robot and, therefore, the load ends up being distributed uniformly.

The proposed solution uses minimal internal space to allow the subsequent passage of electrical cables and hoses, generally used in robots. It also allows fragmenting the mesh into as many parts as necessary so that systems, such as load cells and motors, are able to act between modules.

Thus, the solution proposed in this invention takes up little space for the anchoring system, and can be used in pipes of small internal diameter, still being a robust tension anchoring solution. It can be applied to any part of the robot and as many times as necessary, not being limited to the connection with the umbilical.

Document RU2629857C1 discloses an anchoring and connection technique between two elements, consisting of a seal and a force shell, containing an inner tube and an outer coupling between the conical sections of which said shells are fixed and sealed. Despite presenting an anchoring means, the method in question, however, still requires a permanent fixation by welding, unlike the present invention.

Document GB2439147A discloses an end-fitting technique for anchoring and connecting two elements, where an inner collar is employed to which an end fitting can be fixed, and which further includes a portion that extends in an axial direction away from an end-fitting body to a region where the flexible tube body armor wire layers are located. Despite presenting a means of anchoring, the document, however, addresses to an already used fixation technique, where epoxy resins are used, or some other fluid sealant so that the final structure is substantially solid.

Document U.S. Pat. No. 8,079,619B2 discloses an end-fitting connection of anchoring and connection between two elements, which comprises a tubular body of flexible material arranged between the inner and outer members. It uses a kind of retaining member to secure a portion of the hose braid to help prevent it from being pulled from the fixture. Despite presenting an anchoring means, the employed method has a construction different from the present invention, since part of the braided material of the hose will be tensioned in the locking.

As described, for anchoring solutions capable of being disassembled, the State of the Art does not have the unique features of this invention, which will be presented in detail below.

OBJECTIVE OF THE INVENTION

The compact anchoring system of the present invention aims at composing the structure of a robotic equipment that operates inside pipes, and can be applied in several structures that work under tension, using fiber meshes in the form of a cylindrical sleeve. The invention can be applied to connect the robotic system with, for example, umbilical cables, or then to separate the same into several modules, each containing a pair of anchors.

BRIEF DESCRIPTION OF THE INVENTION

The present invention proposes a solution for anchoring systems by the self-locking of high-strength woven fiber sleeves.

The invention is used to compose the structure of a robotic system that operates inside pipes. The system proposed in this invention is demountable and does not use resin to anchor the flexible web. It uses a lace under a ring that is in the largest possible circumference of the robot, causing the tension load ends up being uniformly distributed.

The solution proposed in this invention takes up little space for the anchoring system, and can be applied in pipes of reduced internal diameter, still being a robust tension anchoring solution.

The invention can be applied to any part of the robot and as many times as necessary, not being limited to the connection with the umbilical.

BRIEF DESCRIPTION OF DRAWINGS

The present invention will be described in more detail below, with reference to the attached figures which, in a schematic form and not limiting the inventive scope, represent examples of its embodiment. In the drawings, there are.

DETAILED DESCRIPTION OF THE INVENTION

There follows below a detailed description of a preferred embodiment of the present invention, by way of example and in no way limiting. Nevertheless, it will be clear to a technician skilled on the subject, from reading this description, possible further embodiments of the present invention still comprised by the essential and optional features below.

Figure 1A:
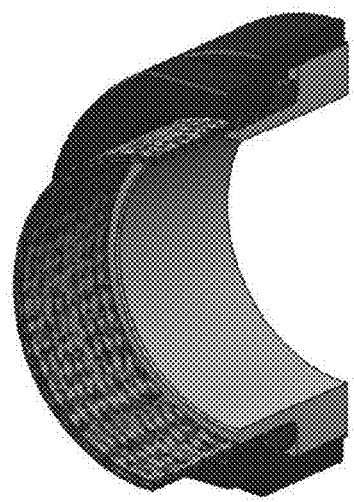
FIG. 1A, which illustrates a first sectional view of a first configuration anchoring solution of the present invention.
Figure 1B:
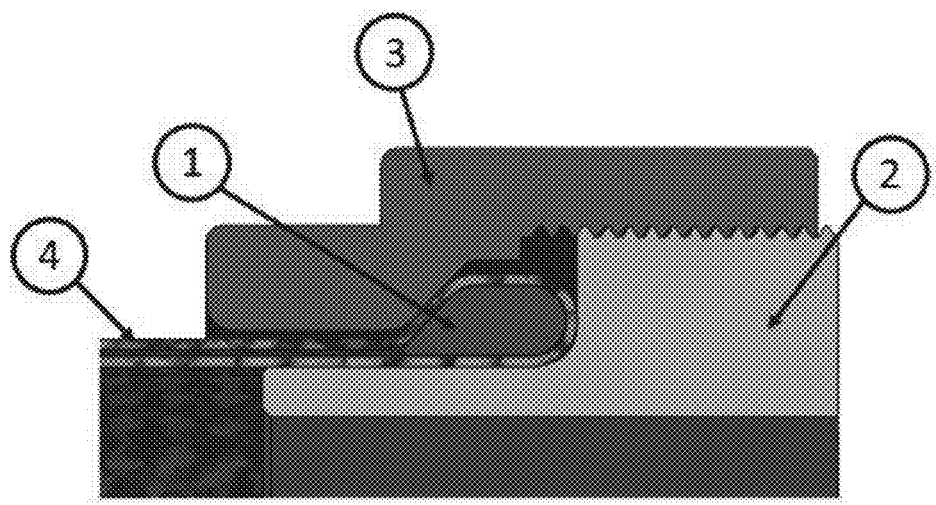
FIG. 1B, which illustrates a second sectional view of the first configuration anchoring solution of the present invention.
Figure 2A:
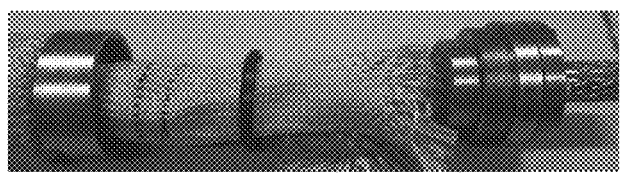
FIG. 2A, which illustrates a first view of an application of the first configuration anchoring solution of the present invention for testing.
Figure 2B:
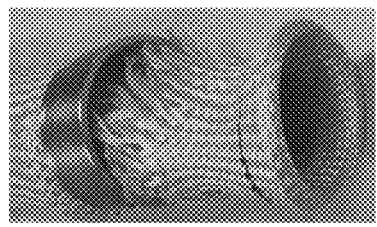
FIG. 2B, which illustrates a second view of an application of the first configuration anchoring solution of the present invention for testing.
Figure 2C:
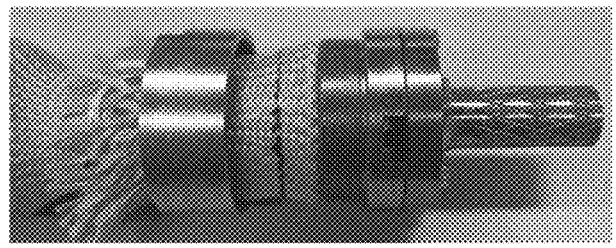
FIG. 2C, which illustrates a third view of an application of the first configuration anchoring solution of the present invention for testing.
Figure 2D:
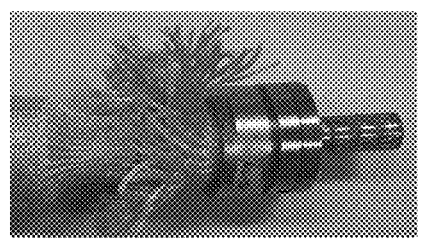
FIG. 2D, which illustrates a fourth view of an application of the first configuration anchoring solution of the present invention for testing.

The solution found by the present application seeks to solve the problems of anchoring in pipes with reduced internal diameter. In FIGS. 1 and 2, there can be seen a representation of a first configuration of an assembled anchor and the assembly sequence, respectively. In FIG. 1, the four components of the invention are represented: on the outside, with a female thread, there is the stop of a ring (3); inside, a woven sleeve (4) of aramid threads (which can be any fiber mesh: glass, carbon, basalt, for example) lacing the ring (1) and, internally, the house of the ring (2). The purpose of the sleeve lace under the ring is that, when the sleeve is tensioned, it pulls the ring against its stop and thus performs a self-locking. The self-locking occurs because the friction force generated at the lace interface is greater than the sleeve tension force. Further allied to the self-locking, so that there is an initial friction force, the mesh is tightened, by threading the stop of the ring (3) in the house of the ring (2).

Figure 3A:
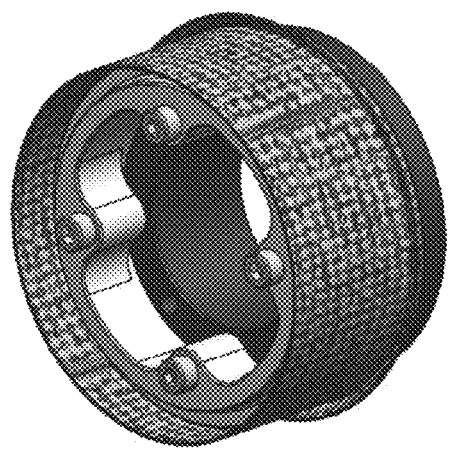
FIG. 3A, which illustrates a first sectional view of the inverted anchoring solution of the present invention.
Figure 3B:
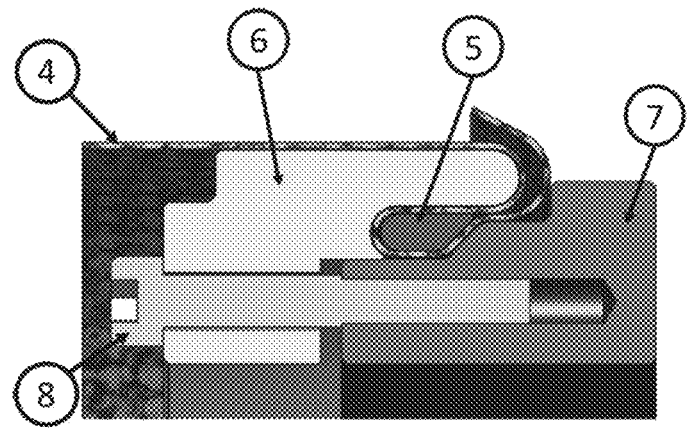
FIG. 3B, which illustrates a second sectional view of the inverted anchoring solution of the present invention.

In FIG. 3, there can be seen a representation of the invention, although with the direction of the sleeve inverted, where in the image there are the four components of the invention: on the outside, the house of the inverted ring (6); internally, the woven sleeve (4) lacing the inverted ring (5), and in the lower part of the system, the inverted ring stop (7). In this configuration, the web comes out of the upper part of the system, thus being able to house components inside the mesh. As with previously described configurations, when tensioning the mesh, it pulls the ring against the stop, promoting the self-locking. The screws (8) seen in the image provide the initial tightening. The main difference between the configurations of the invention is that in the first configuration, a reversal of the direction of the sleeve is made, and in the other inverted configuration, two changes of direction are made. This allows the woven sleeve to wrap components within the same, being fixed at last, because the exposed fixed end can be pulled to perform the circumference alignment. The inverted configuration also allows the initial tightening to be performed differently. In the first configuration, this is done by screwing the ring stop (3); in the inverted configuration of the invention, this is done by tightening the four screws (8) seen in FIG. 3.

Figure 4:
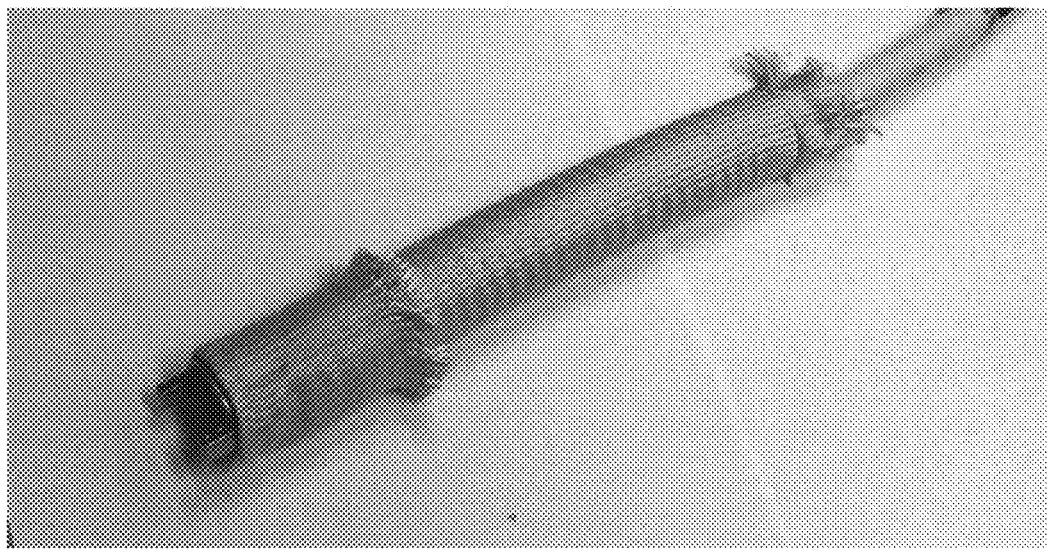
FIG. 4, which illustrates an application of the inverted anchoring solution of the present invention in a robot connection.
Figure 5A:
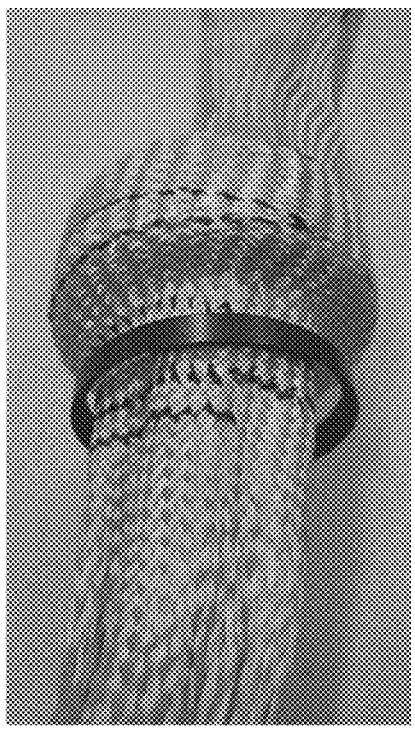
FIG. 5A, which illustrates a first view of the assembly of the inverted anchoring solution of the present invention in a connection with the robot.
Figure 5B:
FIG. 5B, which illustrates a second view the assembly of the inverted anchoring solution of the present invention in a connection with the robot.
Figure 5C:
FIG. 5C, which illustrates a third view the assembly of the inverted anchoring solution of the present invention in a connection with the robot.
Figure 5D:
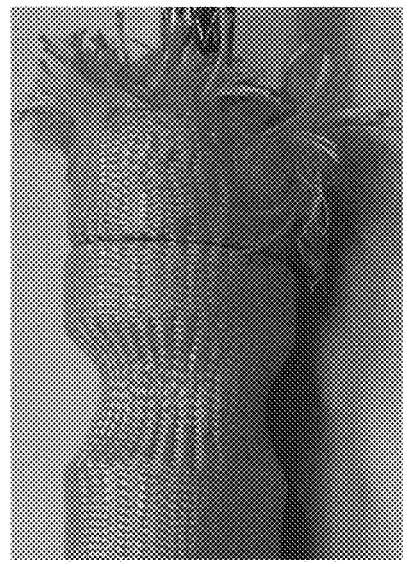
FIG. 5D, which illustrates a fourth view the assembly of the inverted anchoring solution of the present invention in a connection with the robot.

In FIG. 4, there is shown the application of the first configuration, where on the left side there will be connected the load cell used in the robot and, on the right side, there is the application of the inverted anchoring to interconnect the robot with the umbilical cable connector that powers the same.

Figure 6:
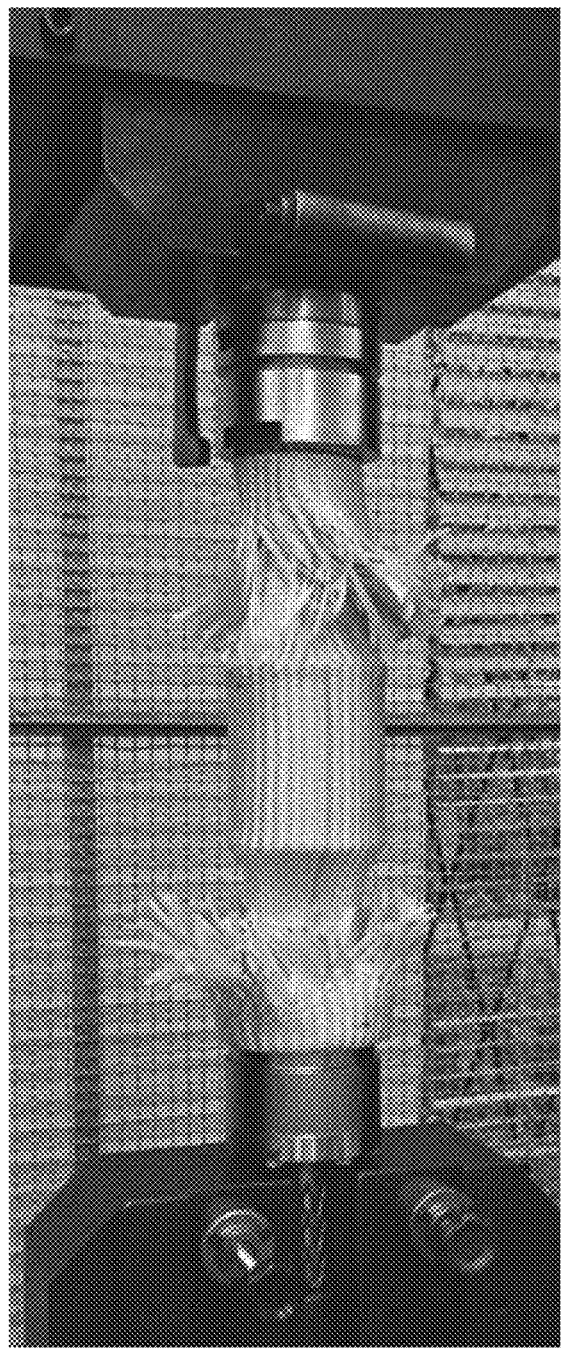
FIG. 6, which illustrates a test carried out to validate the two applications of the solutions of the present invention.
Figure 7:
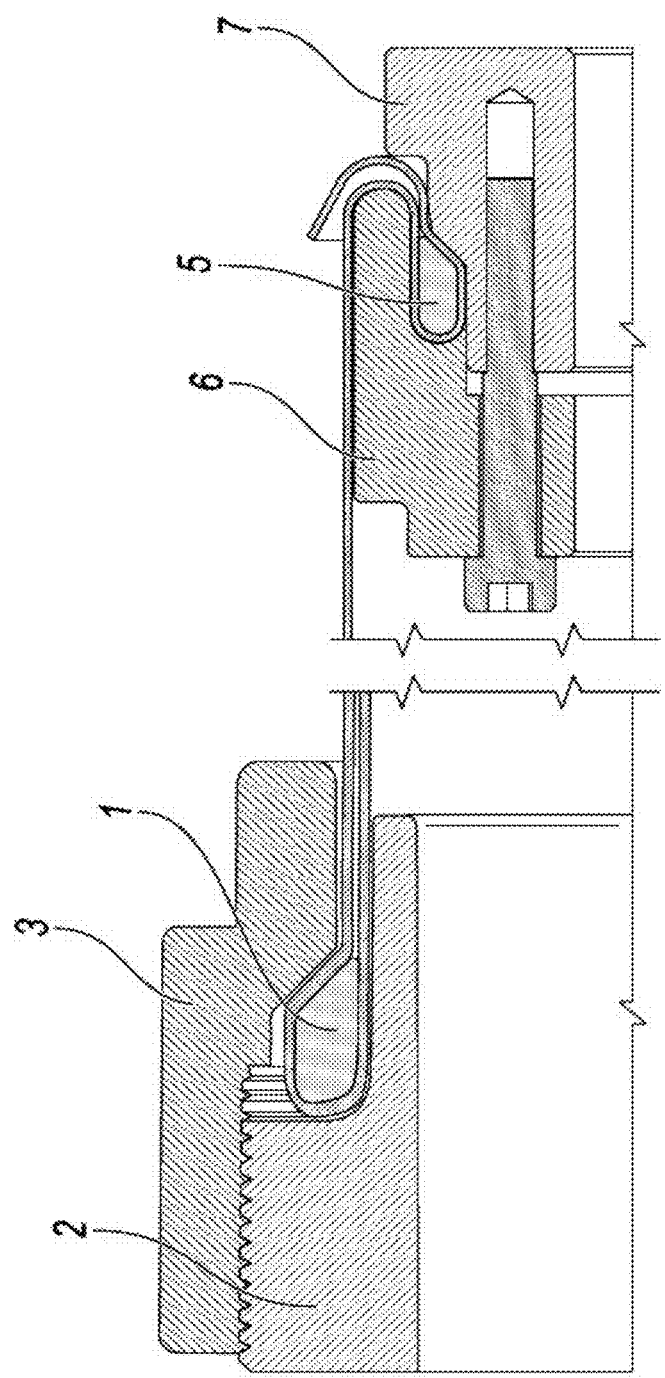
FIG. 7, which illustrates a sectional view of the first configuration anchoring solution and the inverted anchoring solution.

There can also be seen in FIGS. 2 and 5 the assembly processes performed in each configuration of the anchors, as well as their tensile test for system validation, as shown in FIG. 6.

It is important to emphasize that the application of pre-tightening in the system ensures that it has an initial friction force.

The invention described herein is capable of enabling and simplifying the application of systems tensioned by fiber meshes when in restricted dimensional environments. It is capable of reducing production costs, because the assembly of the system does not depend on the application of resins. It also reduces assembly time, since resins take time to fully cure. It is easy to maintain, as the system is demountable. Another advantage with the application of the invention is the reduction of workers' exposure to volatile resin compounds used to anchor the sleeve elements.

The invention claimed is:

1. A system to anchor self-locking woven fiber sleeves, the system comprising:
   a woven sleeve having a first segment and a second segment opposite the first segment, wherein the first segment comprises a first anchoring system and the second segment comprises a second anchoring system,
   wherein the first anchoring system comprises:
      a ring;
      a ring house having an outer surface and threads defined along the outer surface; and
      a ring stop having an inner surface and threads defined along the inner surface of the ring stop, the threads along the inner surface configured to mate with the threads along the outer surface of the ring house,
wherein the ring is between the ring house and the ring stop when the first anchoring system is assembled, and
wherein the second anchoring system comprises:
an inverted ring;
an inverted ring house; and
an inverted ring stop, wherein the inverted ring is between the inverted ring house and the inverted ring stop when the second anchoring system is assembled.

2. The system according to claim 1, wherein the first segment of the woven sleeve laces the ring such that, when the woven sleeve is tensioned, the first segment of the woven sleeve pulls the ring against the ring stop and becomes locked.

3. The system according to claim 2, wherein an initial friction force is generated in the system by tightening the woven sleeve and threading the ring stop in the ring house.

4. The system according to claim 1, wherein, in the second anchoring system, when the woven sleeve is tensioned, the woven sleeve pulls the inverted ring against the inverted ring house and becomes locked.

5. The system according to claim 1, wherein, in the first anchoring system, initial tightening is done by threading the ring stop and, in the second anchoring system, initial tightening is done by tightening one or more screws extending between the inverted ring house and the inverted ring stop.

* * * * *